Aug. 15, 1950    J. W. REARDON ET AL    2,519,065
DYNAMOELECTRIC MACHINE
Filed Sept. 3, 1948    2 Sheets-Sheet 2
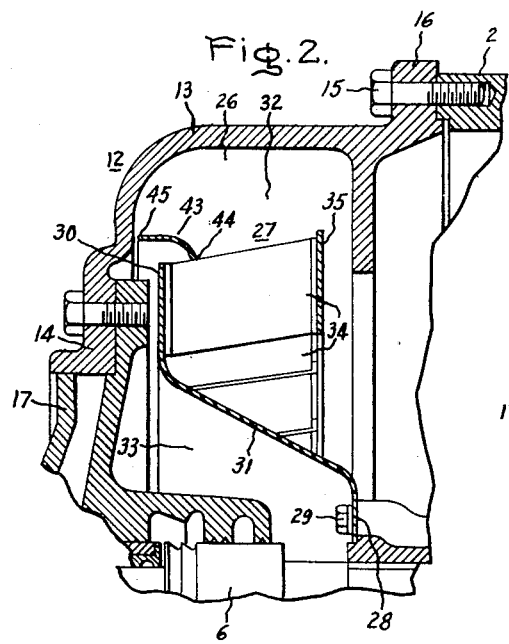
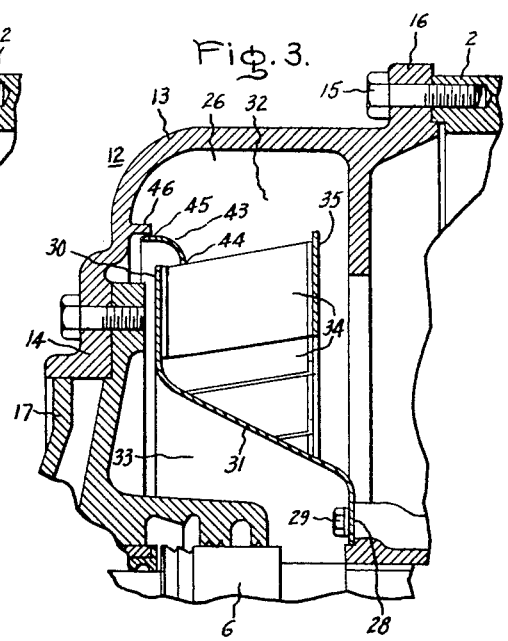
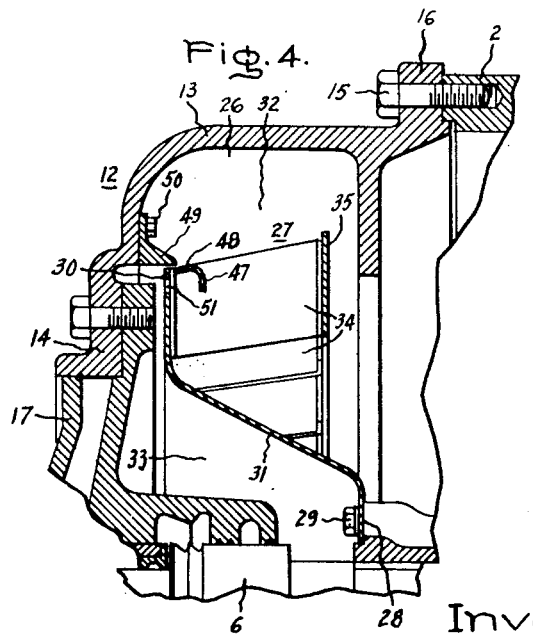
Inventors:
J. Willard Reardon,
Marvin A. Baker,
by Crowell A. Mack
Their Attorney.

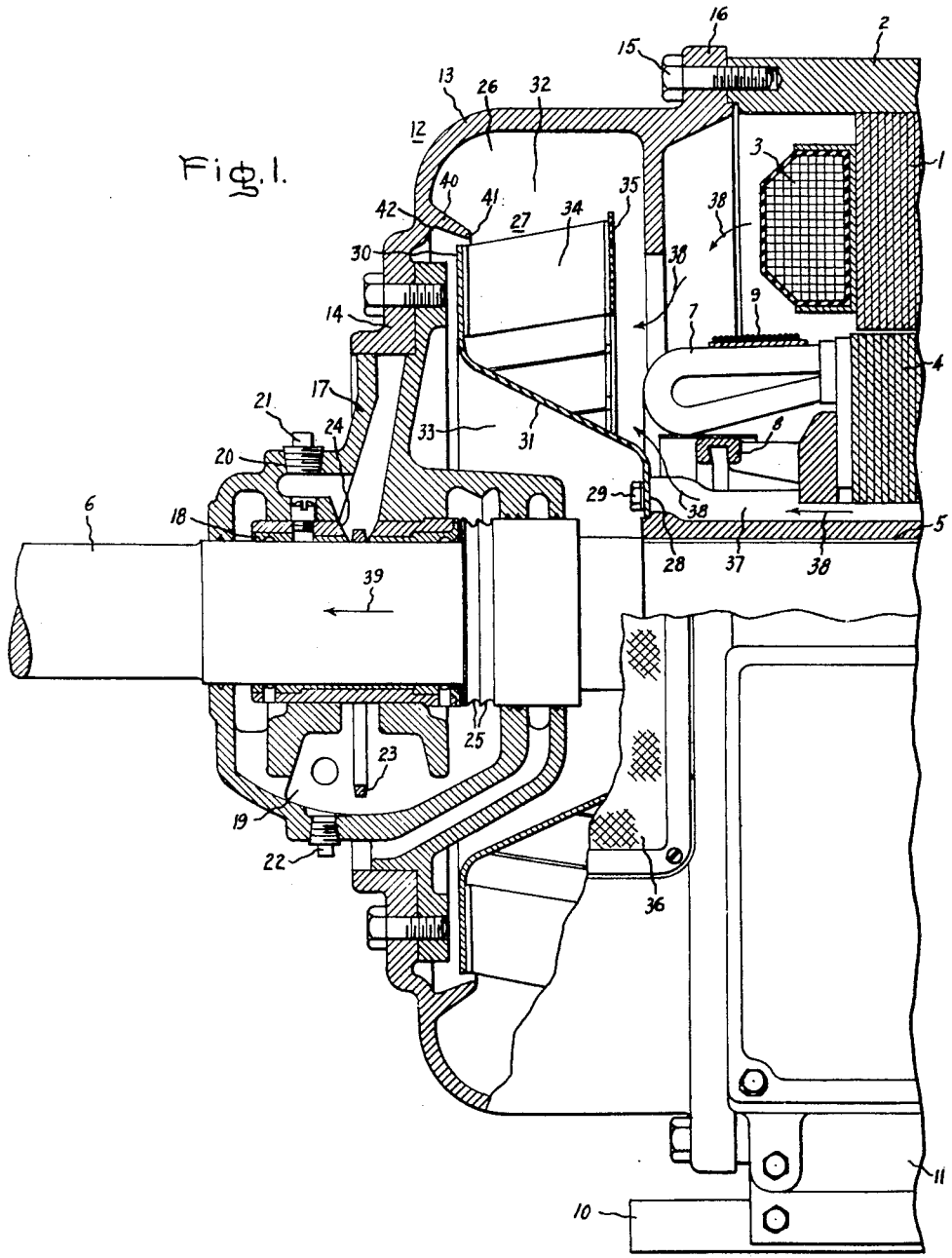

Patented Aug. 15, 1950

2,519,065

UNITED STATES PATENT OFFICE 2,519,065

DYNAMOELECTRIC MACHINE

John Willard Reardon and Marvin A. Baker, Fort Wayne, Ind., assignors to General Electric Company, a corporation of New York Application September 3, 1948, Serial No. 47,612

12 Claims. (Cl. 171—252)

This invention relates to dynamoelectric machines and more particularly to dynamoelectric machines of the fan-cooled type.

It has been found that in certain dynamoelectric machines utilizing fan cooling, the operation of the fan in the end shield creates a pressure differential between the intake side of the fan and the dead air space in the end shield behind the fan. This differential in pressure results in objectionable axial end thrust on the shaft end, furthermore, the existence of a low pressure area behind the fan allows the atmospheric pressure outside the bearing to force lubricant through the bearing and along the shaft into the machine. It is, therefore, desirable in the design of such machines to provide means for equalizing this differential in pressure.

An object of this invention is to provide an improved fan-ventilated dynamoelectric machine.

Another object of this invention is to provide an improved fan-cooled dynamoelectric machine wherein the pressure differential between the front and back sides of the fan is equalized.

Further objects and advantages of this invention will be better understood from the following description referring to the accompanying drawing. The features of novelty which characterize this invention will be pointed out with particularity in the claims annexed to and forming a part of this specification.

In one embodiment of this invention, the pressure differential between the intake and back sides of the fan is equalized by utilizing an air scoop completely surrounding and overhanging the back edge of the fan. This scoop serves to utilize the pressure built up by the fan to cancel out the centrifugal effect of the back side of the fan and thus equalize the pressure on both sides.

In the drawings, Fig. 1 is a side elevational view, partly in section, of a fan-ventilated dynamoelectric machine incorporating one embodiment of the improved pressure equalization means of this invention; Fig. 2 illustrates another embodiment of this invention; Fig. 3 shows a modification of the embodiment of Fig. 2; and Fig. 4 illustrates a further embodiment of this invention.

Referring now to Fig. 1, there is shown a dynamoelectric machine having a stationary member 1 suitably mounted in a frame 2 and provided with appropriate field exciting winding 3. A rotatable member 4 is mounted within and concentric with the stationary member 1 and is suitably secured as by a key 5 to a rotatable shaft 6. The rotatable member 4 is provided with windings 7 supported by an annular flange 8 and secured against the action of centrifugal force by lacing 9. The frame member 2 is secured to a suitable base member or foot 10 in any convenient manner, such as by welded-on supports 11.

An end shield 12 is provided having an outer portion 13 and an inner portion 14 and is secured to the frame member 2 in any suitable manner, as by bolts 15 in mounting flange 16. A separate bearing housing 17 is rabbeted into the inner portion 14 of the end shield 12 and supports a bearing 18 in which is rotatably seated the shaft 6. A lubricant reservoir 19 is formed in the lower portion of the bearing housing 17, the lubricant being introduced through an opening 20 in which a pipe plug 21 is seated. A pipe plug 22 closes an opening in the lower portion of the bearing housing 17 used for draining the lubricant reservoir 19. A lubricating ring 23 rides on the journal surface of the shaft 6 in an opening 24 of the bearing 18. Lubricant slinging grooves 25 are formed on the shaft 6 to prevent lubricant which travels along the shaft from passing into the interior of the machine.

The end shield 12 defines with the stationary member 1 and the rotatable member 4 an annular cavity 26 in which a fan 27 is positioned. The fan is provided with an annular back plate which has its inner edge 28 secured to the rotatable member 4 in any suitable manner, as by bolts 29, and its outer portion 30 positioned adjacent the inner end shield portion 14. The intermediate portion 31 of the back plate is conical in shape and divides the annular cavity 26 into an outer cavity 32 and an inner cavity 33. A plurality of fan blades 34 are secured to the outer portion 30 of the back plate, on the side thereof remote from the inner end shield portion 14, and extend into the outer cavity 32 toward the stationary member 1 and the rotatable member 4. The outer ends of the fan blades 34 are secured in place by an annular shroud member 35. The outer portion 13 of the end shield is provided with an exhaust opening or openings 36 communicating with the outer cavity 32. As the rotatable member 4 and fan 27 rotate, air is drawn through the machine from an inlet at the other end thereof (not shown), passing between the poles and through openings 37 in the rotatable member 4, as shown by the arrows 38. This air, having abstracted the heat from the stationary member 1 and rotatable member 4, is exhausted by the fan through the exhaust opening 36.

The intermediate conical portion 31 of the back plate has no openings and, therefore, the centrifugal action of the rotating fan creates a low pressure area in the inner cavity 33 and a high pressure area in the outer cavity 32. Unless this pressure differential between the outer cavity 32 or intake side of the fan and the inner cavity 33 or back side of the fan is equalized, the pressure in the outer cavity 32 will cause objectionable axial end thrust on the shaft 6 in the direction shown by the arrow 39. Furthermore, the low pressure in the inner cavity 33 results in the atmospheric pressure outside the bearing 18 causing lubricant to be forced along the shaft and into the interior of the machine. In order to equalize this pressure differential between the front and back sides of the fan, the arrangement now to be described is provided. An annular flange 40, which is preferably substantially continuous, is formed at the outer edge of the inner end shield portion 14 and surrounds and overlaps the outer portion 30 of the back plate and a portion of the outer edge of the blades 34 immediately adjacent thereto. The annular flange 40 may be formed integral with inner end shield portion 14, or may be a separate member or plurality of members secured to the inner end shield portion 14 in any suitable manner, as by welding or bolts. This annular flange is preferably, but not necessarily, conical in shape with its inside diameter at its free edge 41 being smaller than its inside diameter at the junction 42 with the end shield. The annular flange 40 serves as an air scoop to divert some of the high pressure air from the outer cavity 32 into the inner cavity 33, thereby neutralizing the objectionable pressure differential. This arrangement has been found not only to remove the axial end thrust on the shaft, but also to stop the leakage of lubricant along the shaft into the interior of the machine. While the improved pressure equalization means of this invention is shown to apply to an air-cooled machine, it will be readily understood that it is also applicable to a totally closed machine and to a machine wherein the cooling medium is a gas rather than air.

Referring now to Fig. 2 in which like elements are indicated by like reference numerals, there is shown another embodiment of this invention wherein the annular flange or air scoop is secured to the fan instead of the inner end shield portion, as shown in Fig. 1. Here, the end shield 12 is provided with an outer portion 13 and an inner portion 14 and is secured to the frame member 2 in any suitable manner as by bolts 15 in the mounting frame 16. The bearing housing 17 is rabbeted into the inner end shield portion 14 and supports the bearing in an identical manner to the construction of Fig. 1. The end shield 12 defines an annular cavity 26 in which the fan 27 is positioned. The fan 27 has an annular back plate with its inner edge 28 secured to the rotatable member 4 in any suitable manner as by bolts 29 and its outer portion 30 positioned adjacent the inner end shield portion 14. The intermediate portion 31 of the back plate is conical in shape and divides the cavity 26 into an outer cavity 32 and an inner cavity 33. A plurality of fan blades 34 are secured to the outer portion 30 of the fan back plate and extend into the outer cavity 32, the outer ends of the fan blades being secured in place by an annular shroud member 35.

The centrifugal action of the rotating fan creates a low pressure area in the inner cavity 33 and a high pressure area in the outer cavity 32. In order to equalize this pressure differential, a substantially continuous annular scoop or ring member 43 is provided having its inner edge 44 secured to the outer edges of the fan blades 34 in any suitable manner, as by welding, and its outer edge 45 adjacent the inner surface of the inner end shield portion 14. The inner edge 44 of the scoop member 43 is spaced from the outer edge 30 of the fan back plate and thus the scoop member diverts some of the high pressure air from the fan 27 into the inner cavity 33, thereby neutralizing the objectionable pressure differential eliminating the axial end thrust on the shaft and stopping the leakage of lubricant along the shaft into the interior of the machine.

Referring now to Fig. 3, in which like parts are indicated by like reference numerals, there is shown a modification of the embodiment of Fig. 2. Here, in addition to the annular scoop member 43 secured to the outer edges of the fan blades 34, there is also provided a substantially continuous annular flange member 46 formed on or otherwise secured to the inner surface of the inner end shield portion 14. This annular flange projects into the outer cavity 32 and surrounds and overlaps the outer edge 45 of the fan scoop member 43. The annular flange 46 serves to further entrap the air diverted from the fan by the fan scoop member 43 and to insure that substantially all of the air thus diverted is directed into the inner cavity 33 to neutralize the pressure differential.

Referring now to Fig. 4, in which like elements are indicated by like reference numerals, there is shown a further embodiment of this invention wherein scoop portions 47 are positioned between the fan blades 34 with their outer edges 48 secured to the outer edge 30 of the fan back plate. These scoop portions 47 form a substantially continuous annular scoop member around and flush with the outer periphery of the fan 27. A substantially continuous annular flange 49 is secured to the inner surface of the inner end shield portion 14 in any suitable manner, as by bolts 50. The annular flange 49 surrounds and overlaps the outer edge 30 of the fan back plate and the outer edge 48 of the scoop portions 47. A plurality of openings 51 are formed in the outer edge 30 of the fan back plate adjacent the outer edge 48 of the scoop portions 47. As the fan 27 rotates, a portion of the high pressure air from the fan is diverted by the scoop portions 47 through the openings 51 in the outer edge 30 of the back plate and is further directed by the annular flange 49 into the inner cavity 33 to equalize the pressure differential.

It can now be readily seen that this invention provides an improved fan-ventilated dynamoelectric machine by equalizing the pressure differential between the inlet and back sides of the fan, thus preventing axial end thrust on the shaft and leakage of lubricant along the shaft and into the machine.

While there is illustrated and described a particular embodiment of this invention, modifications thereof will occur to those skilled in the art. We desire it to be understood, therefore, that this invention is not to be limited to the particular arrangement disclosed, and we intend in the appended claims to cover all modifications which do not depart from the spirit and scope of this invention.

What we claim as new and desire to secure by Letters Patent of the United States is:

1. In a dynamoelectric machine having a stationary member and a rotatable member mounted on a shaft, an end shield having a bearing for rotatably supporting said shaft and defining an annular cavity with said stationary and rotatable members, a fan mounted in said cavity for ventilating said machine, said fan having an imperforate annular back plate with blades secured on the outer periphery thereof, said blades extending from the side of said fan back plate remote from said end shield into said cavity toward said stationary and rotatable members, and a substantially continuous annular scoop member having its inner edge secured to the outer edges of said blades spaced from said fan back plate and its outer edge adjacent said end shield for diverting air from said fan into the space on the end shield side of said fan back plate whereby the pressure differential between the rotor side and the end shield side of said fan back plate is equalized preventing axial end thrust on said shaft and preventing atmospheric pressure outside said bearing from forcing lubricant into said machine.

2. In a dynamoelectric machine having a stationary member and a rotatable member mounted on a shaft, an end shield having a bearing for rotatably supporting said shaft, a fan mounted on said rotatable member intermediate said end shield and said stationary and rotatable members for ventilating said machine; said fan comprising an annular imperforate conical back plate having its outer portion adjacent said end shield and its inner portion adjacent said rotatable member and defining an outer cavity with the outer portion of said end shield and said stationary and rotatable members and an inner cavity with the inner portion of said end shield and said bearing, and blades secured to the outer portion of said fan back plate and extending from the side of said fan back plate remote from said end shield into said outer cavity toward said stationary and rotatable members; the outer portion of said end shield having an exhaust opening therein communicating with said outer cavity, and a substantially continuous annular scoop member having its inside edge secured to the outer edges of said blades spaced from said outer portion of said fan back plate and extending into said outer cavity with its outer edge adjacent said end shield for diverting air from said fan into said inner cavity whereby the pressure differential between said outer cavity and said inner cavity is equalized preventing axial end thrust on said shaft and preventing atmospheric pressure outside said bearing from forcing lubricant into said inner cavity.

3. In a dynamoelectric machine having a stationary member and a rotatable member mounted on a shaft, an end shield having a bearing for rotatably supporting said shaft and defining an annular cavity with said stationary and rotatable members, a fan mounted in said cavity for ventilating said machine, said fan having an imperforate annular back plate with blades secured on the outer periphery thereof, said blades extending from the side of said fan back plate remote from said end shield into said cavity toward said stationary and rotatable members, and a substantially continuous annular scoop member having its inner edge secured to the outer edges of said blades spaced from said fan back plate and its outer edge adjacent said end shield for diverting air from said fan into the space on the end shield side of said fan back plate whereby the pressure differential between the rotor side and the end shield side of said back plate is equalized preventing axial end thrust on said shaft and preventing atmospheric pressure outside said bearing from forcing lubricant into said machine, said end shield having a substantially continuous annular flange extending into said cavity and surrounding and overhanging said outer edge of said scoop member for directing the air diverted by said scoop member into the space on the end shield side of said fan back plate.

4. In a dynamoelectric machine having a stationary member and a rotatable member mounted on a shaft, an end shield having a bearing for rotatably supporting said shaft, a fan mounted on said rotatable member intermediate said end shield and said stationary and rotatable members for ventilating said machine; said fan comprising an annular imperforate conical back plate having its outer portion adjacent said end shield and its inner portion adjacent said rotatable member and defining an outer cavity with the outer portion of said end shield and said stationary and rotatable members and an inner cavity with the inner portion of said end shield and said bearing, and blades secured to the outer portion of said fan back plate and extending from the side of said fan back plate remote from said end shield into said outer cavity toward said stationary and rotatable members; the outer portion of said end shield having an exhaust opening therein communicating with said outer cavity, and a substantially continuous annular scoop member having its inside edge secured to the outer edges of said blades spaced from said outer portion of said back plate and extending into said outer cavity with its outer edge adjacent said end shield for diverting air from said fan into said inner cavity whereby the pressure differential between said outer cavity and said inner cavity is equalized preventing axial end thrust on said shaft and preventing atmospheric pressure outside said bearing from forcing lubricant into said inner cavity, said inner portion of said end shield having a substantially continuous annular flange extending into said outer cavity and surrounding and overhanging said outer edge of said scoop member for directing the air diverted by said scoop member into said inner cavity.

5. In a dynamoelectric machine having a stationary member and a rotatable member mounted on a shaft, an end shield having a bearing for rotatably supporting said shaft and defining an annular cavity with said stationary and rotatable members, a fan mounted in said cavity for ventilating said machine, said fan having an annular back plate with blades secured on the outer periphery thereof, said blades extending from the side of said fan back plate remote from said end shield into said cavity toward said stationary and rotatable members, a plurality of openings in the outer periphery of said fan back plate respectively intermediate said blades, and a plurality of scoop members respectively positioned between the outer edges of said blades forming a substantially continuous annular scoop around the outer periphery of said fan for diverting air from said fan through said openings into the space on the end shield side of said fan back plate whereby the pressure differential between the rotor side and the end shield side of said fan back plate is equalized preventing axial end thrust on said shaft and preventing atmospheric pressure outside said bearing from forcing lubricant into said machine.

6. In a dynamoelectric machine having a stationary member and a rotatable member mounted on a shaft, an end shield having a bearing for rotatably supporting said shaft and defining an annular cavity with said stationary and rotatable members, a fan mounted in said cavity for ventilating said machine, said fan having an annular back plate with blades secured on the outer periphery thereof, said blades extending from the side of said fan back plate remote from said end shield into said cavity toward said stationary and rotatable members, a plurality of openings in the outer periphery of said fan back plate respectively intermediate said blades, and a plurality of scoop portions respectively positioned between the outer edges of said blades forming a substantially continuous annular scoop member around the outer periphery of said fan for diverting air from said fan through said openings into the space on the end shield side of said fan back plate whereby the pressure differential between the rotor side and the end shield side of said fan back plate is equalized preventing axial end thrust on said shaft and preventing atmospheric pressure outside said bearing from forcing lubricant into said machine, said end shield having a substantially continuous annular flange extending into said cavity and surrounding and overhanging said scoop member for directing the air diverted by said scoop member into the space on the end shield side of said fan back plate.

7. In a dynamoelectric machine having a stationary member and a rotatable member mounted on a shaft, an end shield having a bearing for rotatably supporting said shaft, a fan mounted on said rotatable member intermediate said end shield and said stationary and rotatable members for ventilating said machine; said fan comprising an annular conical back plate having its outer portion adjacent said end shield and its inner portion adjacent said rotatable member and defining an outer cavity with the outer portion of said end shield and said stationary and rotatable members and an inner cavity with the inner portion of said end shield and said bearing, and blades secured to the outer portion of said fan back plate and extending from the side of said back plate remote from said end shield into said outer cavity toward said stationary and rotatable members; the outer portion of said end shield having an exhaust opening therein communicating with said outer cavity, a plurality of openings in the outer periphery of said fan back plate respectively intermediate said blades, and a plurality of scoop portions respectively secured between the outer edges of said blades forming a substantially continuous annular scoop member around the outer periphery of said fan for diverting air from said fan through said openings into said inner cavity whereby the pressure differential between said outer cavity and said inner cavity is equalized preventing axial end thrust on said shaft and preventing atmospheric pressure outside said bearing from forcing lubricant into said inner cavity, said inner portion of said end shield having a substantially continuous annular flange extending into said outer cavity and surrounding and overhanging said scoop member for directing the air diverted by said scoop member into said inner cavity.

8. In a dynamoelectric machine having a stationary member and a rotatable member mounted on a shaft, an end shield having a bearing for rotatably supporting said shaft and defining an annular cavity with said stationary and rotatable members, a fan mounted in said cavity for ventilating said machine, said fan having an annular back plate adjacent said end shield with blades secured on the outer periphery thereof, said blades extending from the side of said fan back plate remote from said end shield into said cavity toward said stationary and rotatable members, said end shield forming air outlet means, said outlet means permitting a substantially unrestricted discharge of a first portion of the air from said machine, and means including a substantially continuous annular scoop member having a leading edge projecting into the path of the air stream from said fan intermediate said fan back plate and the remote edges of said fan blades, said leading edge being disposed to project into the path of said air stream at an acute angle so as to divert a second portion of the air from said fan into the space on said end shield side of said fan back plate whereby the pressure differential between the rotor side and the end shield side of said back plate is equalized and thereby preventing axial end thrust on said shaft and preventing atmospheric pressure outside said bearing from forcing lubricant into said machine.

9. In a dynamoelectric machine having a stationary member and a rotatable member mounted on a shaft, an end shield having a bearing for rotatably supporting said shaft and defining an annular cavity with said stationary and rotatable members, and a fan mounted in said cavity for ventilating said machine, said fan having an imperforated annular back plate with blades secured on the outer periphery thereof, said blades extending from the side of said fan back plate remote from said end shield into the cavity toward said stationary and rotatable members, said end shield forming air outlet means radially of said fan, said outlet means permitting a substantially unrestricted radial discharge of a first portion of the air from said fan, said end shield having a substantially continuous annular conical flange with an inside diameter at its free end smaller than its inside diameter at its junction with said end shield, said free end projecting into the path of the air stream from said fan intermediate said fan back plate and the remote edges of the fan blades, said free end being disposed to project into the path of said air stream at an acute angle for diverting a second portion of air from said fan into the space on the end shield side of said fan back plate whereby the pressure differential between the rotor side and the end shield side of said fan back plate is equalized preventing axial thrust on said shaft and preventing atmospheric pressure outside said bearing from forcing lubricant into said machine.

10. In a dynamoelectric machine having a stationary member and a rotatable member mounted on a shaft, an end shield having a bearing for rotatably supporting said shaft and defining an annular cavity with said stationary and rotatable members, and a fan mounted in said cavity for ventilating said machine, said fan having an imperforate annular back plate with blades secured on the outer periphery thereof, said blades extending from the side of said fan back plate remote from said end shield into said cavity toward said stationary and rotatable members, said end shield having exhaust opening means therein communicating with said cavity intermediate said fan back plate and said rotatable and stationary members, said exhaust opening means permitting a substantially unrestricted discharge of air from said fan, a substantially continuous annular flange extending into said cavity and overhanging said fan back plate and a portion of the blades adjacent thereto, said flange having its free end projection into the path of the air stream from said fan at an acute angle for diverting a portion of the air from said fan into the space on the end shield side of said fan back plate whereby the air so diverted by said annular flange is entrapped between said imperforate back plate and said end shield to build up a pressure therebetween and thereby prevent axial end thrust on said shaft and prevent atmospheric pressure outside said bearing from forcing lubricant into said machine, the portion of said end shield between said flange and said bearing being imperforate.

11. In a dynamoelectric machine having a stationary member and a rotatable member mounted on a shaft, an end shield having a bearing for rotatably supporting said shaft, and a fan mounted on said rotatable member intermediate said end shield and said stationary and rotatable members for ventilating said machine; said fan comprising an annular imperforate conical back plate having its outer portion adjacent said end shield and its inner portion adjacent said rotatable member and defining an outer cavity with the outer portion of said end shield and said stationary and rotatable members and an inner cavity with the inner portion of said end shield and said bearing, and blades secured to the outer portion of said fan back plate and extending from the side of said fan back plate remote from said end shield into said outer cavity toward said stationary and rotatable members, the outer portion of said end shield having exhaust opening means therein communicating with said outer cavity and the inner portion of said end shield being imperforate, said exhaust opening means permitting a substantially unrestricted discharge of a first portion of the air from said machine, said end shield having a substantially continuous annular conical flange with its inside diameter at its free end smaller than its inside diameter at the junction of said end shield, said free end projecting into the path of the air stream from said fan intermediate said fan back plate and the remote edges of said fan blades at an acute angle for diverting a second portion of the air from said fan into the inner cavity whereby the air so diverted by said conical flange is entrapped between said back plate and said end shield to build up a pressure in said inner cavity and thereby prevent axial end thrust on said shaft and prevent atmospheric pressure outside said bearing from forcing lubricant into said inner cavity.

12. In a dynamoelectric machine having a stationary member and a rotatable member mounted on a shaft, an end shield defining an annular cavity with said stationary and rotatable members, and a fan mounted in said cavity for ventilating said machine; said fan having an imperforate annular back plate with blades secured on the outer periphery thereof, said blades extending from the side of said back plate remote from said end shield into said cavity toward said stationary and said rotatable members, said end shield forming exhaust opening means radially of said fan, said exhaust opening means permitting a substantially unrestricted discharge of a first portion of the air from said fan, a substantially continuous annular scoop member having a leading edge projecting into the path of the air stream from said fan intermediate said fan back plate and the remote edges of said fan blades, said leading edge being disposed to project into the path of said air stream at an acute angle for diverting a second portion of the air from said fan into the space on the end shield side of said back plate whereby the air so diverted by said annular scoop member is entrapped between said back plate and said end shield to build up a pressure therebetween and thereby prevent axial end thrust on said shaft, the portion of said end shield between said flange and said shaft being imperforate.

J. WILLARD REARDON.
MARVIN A. BAKER.

REFERENCES CITED

The following references are of record in the file of this patent:

UNITED STATES PATENTS

| Number | Name | Date |
|---|---|---|
| 1,222,464 | Priest | Apr. 10, 1917 |
| 1,525,691 | Poth | Feb. 10, 1925 |
| 1,551,295 | Fletcher | Aug. 25, 1925 |
| 1,587,760 | Connell | June 8, 1926 |
| 2,244,406 | Schonwald | June 3, 1941 |